Aug. 27, 1968   E. B. REINBOLD   3,398,776
WHITE SIDEWALL FOR BUTYL PASSENGER TIRES
Filed Oct. 21, 1965
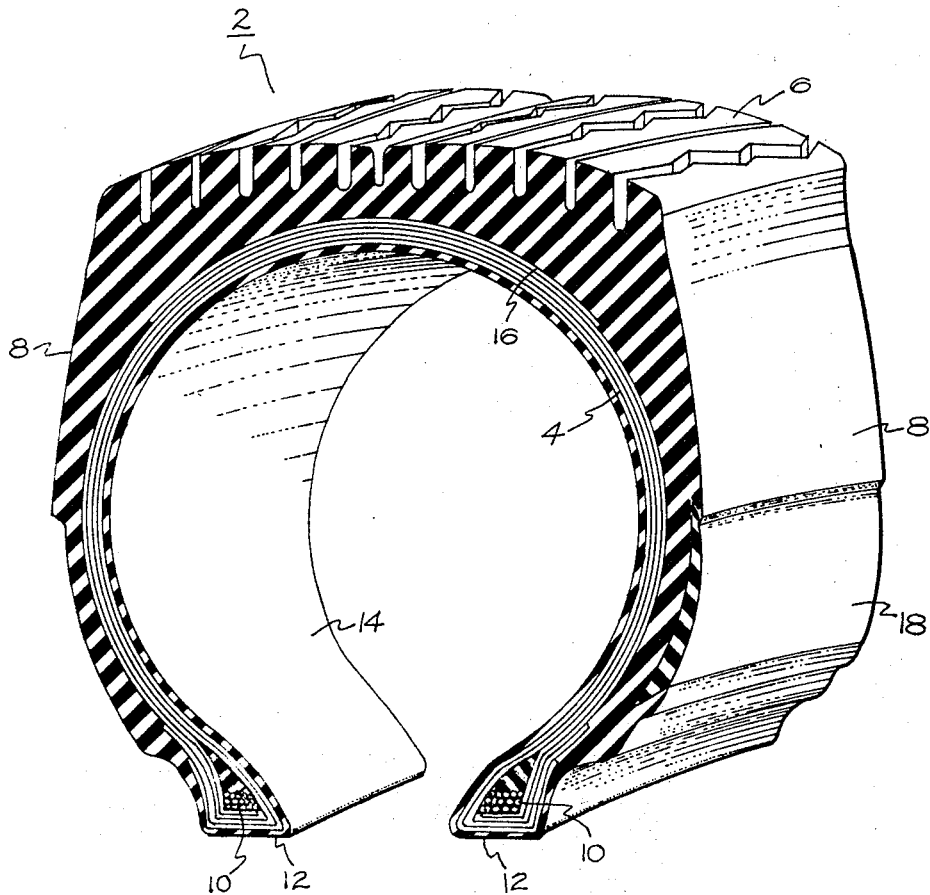
INVENTOR
Emmett B. Reinbold
BY Frank J. Earnheart
   James A. Lucas
ATTORNEYS

United States Patent Office 3,398,776
Patented Aug. 27, 1968

3,398,776
WHITE SIDEWALL FOR BUTYL
PASSENGER TIRES
Emmett Burton Reinbold, Cuyahoga Falls, Ohio, assignor to The General Tire & Rubber Company, a corporation of Ohio
Filed Oct. 21, 1965, Ser. No. 499,611
3 Claims. (Cl. 152—353)

ABSTRACT OF THE DISCLOSURE

A white sidewall composition formulated primarily from butyl rubber and preferably including a minor amount of chlorosulfonated polyethylene is improved by the addition of a polyethylene having an average molecular weight of between about 1,000 and about 5,000. The polyethylene is added in an amount of between about 10 and 30 parts per 100 parts of rubber.

---

With the heavy emphasis being placed on automotive styling, and particularly with the advent of new types of finishes requiring a minimum of maintenance, it is understandable that efforts have also been directed to improving the appearance of the tires on the automobile. Accordingly, some tire manufacturers have provided grooves in the sidewall of the tire into which colored rings, adapted to match the color of the vehicle body, can be inserted. Furthermore, attempts have been made to improve the whiteness and brightness of the white sidewall tire, a tire that has been on the market for many years.

Butyl rubber, a copolymer of an iso-olefin and a diolefin (e.g. isobutylene/isoprene), has long been recognized as having properties which render it very suitable for use in tires, one being its ability to be readily compounded with other ingredients, thus simplifying the processing of the same. Yet another, and perhaps the most important, advantage is its exceptionally good resistance to oxidation and ozonization, phenomena which usually produce cracks in the tread and sidewalls of the tire. Offsetting these advantages is the fact that when butyl rubber is used in formulating the white sidewall portion of a tire, the sidewall tends to remain tacky. This tackiness causes it to readily collect dirt and makes it difficult to clean. Furthermore its scuff resistance, an important consideration in tire whitewalls, is poor.

Others have found that the scuff resistance of butyl whitewalls can be improved by replacing about 10 to 30 parts of butyl rubber with a like amount of chlorosulfonated polyethylene. However, this does not result in any appreciable improvement in the cleanability properties of the whitewall.

It is one object of this invention to provide a butyl sidewall having better cleanability than has heretofore been obtained.

It is another object of this invention to provide a butyl whitewall composition in which a low molecular weight polyethylene is added to reduce the tackiness of the resultant sidewall, thus minimizing the tendency of the sidewall to collect dirt.

These and other objects are accomplished in the manner to be hereinafter described, with particular reference to the figure which shows a white sidewall pneumatic tire of typical construction comprising a carcass, tread and sidewall.

It has been found, according to this invention, that a self-cleaning, non-tacky elastomeric compound can be prepared from a formulation containing butyl rubber and various light colored pigments and fillers by the addition of between about 10 and about 30 parts of a low molecular weight polyethylene to the composition, said amount being based upon 100 parts of rubber. More particularly, an improved self-cleaning sidewall composition can be formulated by the addition of approximately 10 to 30 parts of polyethylene, having a molecular weight of between about 1000 and about 5000, to a blend of approximately 70 to 90 parts of butyl rubber and 30 to 10 parts of chlorosulfonated polyethylene rubber. This latter ingredient is added to the butyl composition to improve the scuff resistance and wearing properties of the butyl rubber. This composition typically contains about 80 to 90 parts of light colored fillers and/or pigments including oxides of various metals and non-metals such as titanium, zinc, magnesium, and silicon.

Referring now to the figure, there is shown a pneumatic tire 2 comprising a carcass 4, tread 6, and sidewall 8. The carcass consists of four plies of skim-coated fabric wrapped around bead bundles 10 to form the bead portion 12 of the tire. Disposed around the interior of the carcass is a suitable liner 14 of impervious material such as butyl or chlorobutyl rubber. A suitable breaker 16 is located over the crown portion of the carcass between the carcass and the tread. A strip of white rubber 18 is anchored in one of the sidewalls, and has an exposed surface which is readily recognized as the whitewall portion of the tire.

It should be noted that the construction of the tire in the figure is exemplary only and is typical of the construction of a pneumatic tire. Various factors such as the number of carcass plies, tread design, profile, etc., can be varied without adversely affecting the scope of this invention. Furthermore, this sidewall composition can be used with tube type as well as tubeless tires.

To further exemplify the invention, the following table shows the formulation of a typical sidewall composition of the type found in the prior art along with a formulation embodying the novel aspects of this invention.

| | Prior art | Novel compound |
|---|---|---|
| Butyl rubber | 85.0 | 85.0 |
| Chlorosulfonated polyethylene | 15.0 | 15.0 |
| Silica pigment | 20.0 | 20.0 |
| Zinc oxide (activator) | 15.0 | 15.0 |
| Titanium dioxide (pigment) | 40.0 | 40.0 |
| Magnesium oxide (stabilizer) | 5.0 | 5.0 |
| Process oil (plasticizer) | 8.0 | 2.0 |
| Ultramarine blue (blueing agent) | 0.2 | 0.2 |
| Tributoxy ethyl phosphate (processing aid) | 2.0 | 2.0 |
| Tetramethyl thiuram disulfide (accelerator) | 1.0 | 1.0 |
| Mercaptobenzothiozole (accelerator) | 2.0 | 2.0 |
| Sulfur (vulcanizing agent) | 2.5 | 2.5 |
| Polyethylene A-C 617A [1] | | 12.5 |

[1] A low molecular weight polymer sold by Allied Chemical and Dye Corporation having an average molecular weight of 1,500 and a melting point of between 210 and 217° F.

In a typical mixing procedure, the ingredients in each of these formulations are blended together in a two-stage Banbury mixer. All of the ingredients, except the chlorosulfonated polyethylene and the various curatives (accelerators and vulcanizing agents), are added in the relatively high temperature first stage to form a masterbatch. The remaining ingredients are then incorporated into the formulation in the second stage of the mixing operation. The homogeneous mass is then extruded into a white sidewall strip which is then built into a tire according to customary procedures.

Typically, the first step in building a tire involves wrapping an inner liner and various carcass plies around a flat band drum of well-known construction. Inextensible bead bundles are then positioned at either side of the drum and the various carcass plies wrapped therearound to form the beads of the tire. Thereafter, the elastomeric tread and sidewall portions of the tire, including the white sidewall strip, are wrapped around the carcass. The tire is then placed in a mold where it is shaped and cured. During the curing operation the black rubber in the sidewall and tread portion of the tire becomes plastic and flows around the layer of white sidewall rubber, completely encapsulating the same. After the curing operation is completed, the layer of black rubber overlying the strip of white rubber is buffed off to expose the white surface.

A comparison was made between one group of tires having whitewalls made from the prior art formulation and a second group with whitewalls made according to the teachings of the present invention. It was found that the whitewalls containing the low molecular weight polyethylene remained noticeably cleaner than those without the polyethylene, and that the former could be more readily cleaned than the latter.

Although 12.5 parts of polyethylene per 100 parts of polymer (butyl and chlorosulfonated polyethylene) were used in the test formulation, it should be noted that higher or lower amounts may be used without deviating from the scope of this invention. If less than 10 parts of polyethylene are used, the amount of improvement in the cleanability of the whitewall compound is minimal. As the amount of polyethylene is increased, there is a resultant improvement in the cleanability of the whitewall. As a practical limitation, no more than 25 or 30 parts of polyethylene can be incorporated into the butyl rubber formulation without adversely affecting other properties and characteristics thereof.

An important factor in the selection of a suitable polyethylene for use in the teachings of this invention is the ease with which the polymer is incorporated into and retained in the whitewall formulation. In the preferred molecular weight range of 1000 to 5000, the polymer can be handled as a solid at room temperatures, but has a melting point which is below the maximum mixing temperatures encountered in the Banbury. Thus, it is capable of being intimately blended with the other ingredients during the processing of the same. If the molecular weight is appreciably below 1000, the polymer becomes a wax or a liquid at room temperatures and as such cannot be used in any appreciable amount in the formulation. On the other hand, if the molecular weight of the polymer is too high, the melting point is above the normal mixing temperatures and blending becomes difficult.

Various modifications can be made in carrying out the teachings of this invention without deviating from the scope thereof. For example, the butyl formulation can be varied by changing the types and amounts of pigments and fillers used therein. Moreover, the specific accelerators, curing agents, antioxidants, etc., are also subject to wide variation. Furthermore, it is contemplated that the sequence of addition of the ingredients, the various details of the blending, and manner in which the whitewall composition may be incorporated into the tire can be varied.

This invention can be used to produce butyl sidewall compositions of various colors other than white by the appropriate selection of the pigments added to the formulation. Furthermore, it can be used to produce self-cleaning light colored butyl rubber objects, other than tire sidewalls, without departing from the scope of the invention which is defined by the following claims in which I claim:

1. A self-cleaning, non-tacky compound comprising 100 parts of elastomer composed of about 70 to 90 parts of butyl rubber and 30 to 10 parts of chlorosulfonated polyethylene, and further containing about 80 to 90 parts of light colored reinforcing fillers including oxides of titanium, silicon, zinc, and magnesium said compound improved by the addition of between about 10 and about 30 parts of a low molecular weight polyethylene having an average molecular weight within the range of approximately 1000 and 5000.

2. A pneumatic tire having a self-cleaning light colored elastomeric sidewall wherein the elastomer is composed primarily of butyl rubber, the improvement comprising the addition of between about 10 and about 30 parts of a low molecular weight polyethylene per 100 parts of elastomer, said polyethylene having an average molecular weight within the range of approximately 1,000 and 5,000.

3. The pneumatic tire as claimed in claim 2 wherein between about 10 and about 30 percent of the butyl rubber is replaced with an equal amount of chlorosulfonated polyethylene.

References Cited

UNITED STATES PATENTS

| | | | |
|---|---|---|---|
| 2,656,297 | 10/1953 | Davis et al. | 260—889 |
| 2,874,743 | 2/1959 | Rowe. | |
| 3,081,279 | 3/1963 | Hammel et al. | 260—889 |
| 3,207,711 | 9/1965 | Spenadel et al. | 260—889 |
| 3,262,997 | 7/1966 | Edwards et al. | 260—889 |

FOREIGN PATENTS 217,159   9/1958   Australia.

OTHER REFERENCES

Barrett et al., The Rubber and Plastics Age, November 1957.

ALLAN LIEBERMAN, *Primary Examiner.*